United States Patent [19]

Georgen et al.

[11] 4,327,118
[45] Apr. 27, 1982

[54] PROCESS FOR THE PREPARATION OF NEW LYSINE-CONTAINING SOLID COMPOSITIONS FOR ADDITION TO ANIMAL FEED

[75] Inventors: Daniel Georgen, Paris; Jean P. Tintignac, Sceaux, both of France

[73] Assignee: Rhone-Poulenc Industries, Paris, France

[21] Appl. No.: 181,881

[22] Filed: Aug. 27, 1980

[30] Foreign Application Priority Data

Aug. 29, 1979 [FR] France ................. 79 21646

[51] Int. Cl.$^3$ .................. A23K 1/16; A23L 1/30
[52] U.S. Cl. .................... 426/656; 426/423; 426/442; 426/465; 426/807
[58] Field of Search ............. 426/74, 97, 656, 423, 426/807, 442, 465; 435/115; 562/562

[56] References Cited

U.S. PATENT DOCUMENTS 2,665,209  1/1954  Brodhacker ............... 426/656 X
4,027,043  5/1977  Schroeder et al. ......... 426/74 X
4,062,988  12/1977 DeSantis ................. 426/807 X
4,160,041  7/1979  Schroeder et al. ......... 426/807 X
4,232,045  11/1980 Pomper et al. ............ 426/656 X

FOREIGN PATENT DOCUMENTS 139205  12/1979  Fed. Rep. of Germany ...... 426/656
47-32556  8/1972  Japan ..................... 426/656
480397  3/1975  U.S.S.R. .................. 426/656
488578  4/1976  U.S.S.R. .................. 426/656

Primary Examiner—Robert A. Yoncoskie
Attorney, Agent, or Firm—Stevens, Davis, Miller & Mosher

[57] ABSTRACT

Solid particulate lysine-containing compositions which do not agglomerate in the presence of atmospheric moisture are obtained by mixing a concentrated lysine fermentation broth with an inorganic additive selected from (i) lime in conjunction with carbon dioxide, (ii) magnesium carbonate, or (iii) a mixture of (i) and (ii), and forming solid particles of the resulting mixture. The compositions obtained are suitable for addition to animal feed.

10 Claims, No Drawings

PROCESS FOR THE PREPARATION OF NEW LYSINE-CONTAINING SOLID COMPOSITIONS FOR ADDITION TO ANIMAL FEED

DESCRIPTION

The present invention relates to new lysine-containing compositions suitable for incorporation in animal feed.

Lysine is an essential amino-acid for single-stomach animals, which is used in particular in feeding of animals.

Lysine can be prepared either by a chemical method or by a biochemical method. Although the biochemical processes are more economic than the chemical processes, the extraction of the lysine, which is effected with relatively low yields, requires particular installations and the use of expensive products.

When it is intended for animal feeding, lysine is mixed with various feeds, such as cereals, the composition of which is rather poorly defined. Under these conditions, the use of purified lysine does not seem to be necessary.

It has been shown that the concentrated broths from lysine-producing fermentations possess the same nutrient properties as purified lysine. The biomass and the various constituents of the fermentation medium which are required to produce lysine, or their degradation products, do not have any adverse effect on the animals treated. However, these broths are viscous liquids which can be difficult to mix with animal feeds. The totally dried fermentation broths lead to pasty, sticky and very hygroscopic solids which are thus difficult to handle.

It has been proposed, in particular in U.S.S.R. Pat. No. 480397 (Institut Mickrobiologii Imeni Avgusta Kirkhenshteina Akademii Nauk Latviiskoi SSR) and in French Patent Application No. 73/40738 (Spofa Usines Pharmaceutique Reunies), published under the number 2217347, to prepare solid compositions from concentrated lysine-producing fermentation broths by the addition of dehydrating products such as powdered silica, expanded perlite, bonemeal, bran, calcium carbonate or fluorine-free phosphate. These compositions do not always possess the required stability; they are frequently hygroscopic or, alternatively, they require the use of the dehydrating additive in an amount such that the lysine content of the final composition is too low.

Numerous inorganic fillers have been tested. In particular, certain silicates such as talc, natural or precipitated calcium carbonate, magnesia, dicalcium phosphate, calcium chloride, plaster of Paris, or natural magnesium carbonate such as magnesite, when they are added to lysine concentrates in proportions which are equal to or greater than 50% (these proportions being the ratio of the weight of the additive to the weight of the final product), do not make it possible to obtain a product which possesses the desired physical characteristics.

It has now been found that a stable solid composition, which is easy to handle, does not solidify in the presence of atmospheric moisture and has a high lysine content, is obtained by mixing with a concentrated lysine fermentation broth an inorganic additive selected from (i) lime in conjunction with carbon dioxide, (ii) precipitated magnesium carbonate, or (iii) a mixture of (i) and (ii), and forming solid particles of the resulting mixture. The amount of lysine present in the initial concentrated lysine broth should be such that the resulting particulate solid composition contains 10 to 35% by weight of lysine. It is this process which forms the subject of the present invention.

It has also been found that other inorganic fillers, such as silicas (e.g. those marketed under the trade names Tixolex, Tixosil or Zeosil, or those known under the trade name Aerosil), silicates (e.g. Calsil) or aluminosilicates (e.g. expanded perlite), can be added to these inorganic additives.

The concentrated broths can be obtained by removing the water from the lysine fermentation broths by heating, optically under reduced pressure. During this heating, the lysine-producing microorganism is deactivated. Industrially, it is particularly advantageous to use a multipurpose concentrator. The concentrated broths are stable with time and the lysine present in these concentrated broths is not degraded during storage.

The lysine fermentation broths can be obtained by fermenting a molasses-based substrate in the presence of a suitable lysine-producing microorganism for 30 to 100 hours. The amounts of lysine produced is generally between 50 and 100 g/liter.

The treatment of a concentrated broth with the additives according to the invention can be carried out in accordance with various techniques. More particularly, when quicklime or slaked lime is used, it is possible to employ the following techniques.

The simplest procedure consists in mixing quicklime, in a malaxator, with a concentrated lysine-broth containing about 60 to 85% by weight of solids, this generally corresponding to a lysine content of 10 to 40% by weight. This procedure exhibits the advantage that the finished product can be obtained directly without subsequent drying. Preferably, the water content of the concentrated lysine-broth used is as low as possible, e.g. between 15 and 40% by weight and more especially between 15 and 30%.

It is possible to recycle some of the finished product in order to achieve a substantial reduction in the duration of the operation and, if appropriate, to permit continuous operation.

The concentrated lysine-broth can be mixed with slaked lime, but in this case it is necessary to dry the finished product in order to obtain a final product possessing the desired characteristics.

Another embodiment consists in spraying an aqueous slurry consisting of concentrated lysine-broth and lime into a fluidised bed. This produces granules which must be dried. In order to carry out this technique, it is necessary to use a concentrated lysine-broth, the water content of which is sufficient for the slurry to be able to pass easily through the spray nozzle.

It is also possible to spray an aqueous slurry consisting of concentrated lysine-broth and lime from a spraying device. In this case, the slurry must be sufficiently dilute to be easily transferable.

In general, a broth containing from 30 to 70% (and more especially from 30 to 50%) by weight of water gives particularly satisfactory results for these last two variants.

These various embodiments of the invention can be used industrially and the last two, more particularly, can be used in continuous operation.

The amount of lime, expressed in terms of CaO, which makes it possible to obtain a satisfactory result is generally between 10 and 50% by weight. It is advantageous to use lime of fairly fine particle size. A particle size of less than 100μ gives particularly satisfactory results.

In the various embodiments it is essential, in order to obtain a final product having the required quality, for the mixture of lime and concentrated lysine-broth to be subjected to the action of carbon dioxide, either after, or preferably during, the mixing operation. For example, mixing the concentrated lysine-broth with lime in a leaktight kneading/malaxating machine or under a nitrogen atmosphere does not lead to a satisfactory product. On the other hand, a satisfactory product is obtained by operating under a carbon dioxide atmosphere for a time which can vary from a few minutes to one hour, depending on the amount of lime used, the water content of the concentrated lysine-broth and the proportion of product recycled. The carbon dioxide can be that which is present in air, but it can be supplied by an external source, optionally under pressure, the latter method being preferable. Supplying carbon dioxide externally permits a much more rapid uptake and the use of a much smaller amount of lime. The calcium carbonate which is formed in this way makes it possible to prepare a product of the desired quality, whilst natural calcium carbonate mixed with a concentrated lysine-broth does not lead to as satisfactory a result.

In general, the carbon dioxide content of the final product, in the form of calcium carbonate, is between 2 and 30% (calculated in terms of calcium carbonate) by weight.

More particularly, the compositions based on lysine and lime, according to the present invention, are presented in the form of solids in particulate (especially granular) form which are easy to handle and which have the following content (by weight) of various constituents.

| | |
|---|---|
| lysine | 10 to 35% |
| broth solids (other than lysine) | 20 to 60% |
| carbon dioxide (expressed in terms of calcium carbonate, the form in which it is effectively present) | 4 to 30% |
| total calcium (essentially in the form of slaked lime and calcium carbonate) | 5 to 35% |
| water | 1 to 25% |

Of outstanding value are the compositions in which the various constituents are in the following proportions (by weight):

| | |
|---|---|
| lysine | 20 to 35% |
| broth solids (other than lysine) | 40 to 50% |
| carbon dioxide (expressed in terms of calcium carbonate) | 8 to 20% |
| total calcium | 7 to 14% |
| water | 1 to 5% |

Such compositions are characterised by an excellent stability. After storage for six months at a temperature of about 20° C., the lysine content of the final product had not changed.

Furthermore, the presence of calcium is compatible with the nutritional requirements of animals and does not constitute a disadvantage.

If precipitated magnesium carbonate or a mixture of lime and precipitated magnesium carbonate, or alternatively a mixture of lime and/or precipitated magnesium carbonate together with inorganic fillers, such as silicas, silicates or aluminosilicates, is used, the same techniques can be employed. The total amount of inorganic filler added generally represents 10 to 50% of the weight of the final composition.

Suitable compositions based on lysine and magnesium carbonate contain 10 to 35% of lysine, 10 to 50% of precipitated magnesium carbonate (or 10 to 50% of precipitated magnesium carbonate and of calcium in the form of slaked lime and calcium carbonate), and 1 to 15% of water, the said percentages being by weight, the remainder consisting of solids contained in the broths from lysine-producing fermentations and, optionally, at least one filler selected from silicas, silicates and aluminosilicates.

The compositions according to the invention are particularly useful in the feeding of animals. As they are solid and do not agglomerate in the presence of moisture, these compositions mix perfectly with the feeds given to animals. Because of the stability of these compositions, it is not necessary to prepare the complete animal feeds at the time of use.

The following Examples illustrate the invention.

EXAMPLE 1

Ground quicklime (CaO; 270 g) is placed in a kneading/malaxating machine of the Kustner type, which has a vessel of capacity 1.6 liters, which comprises 2 malaxating propellers in the form of a double Z with a helical profile, and which is fitted with a jacket in which cold water is circulated. The speed of rotation of the slow rotor is set at 30 rpm and that of the fast rotor is set at 60 rpm. Concentrated lysine-broth (containing 70% by weight of solids and having a lysine content of 21% by weight; 630 g) is then poured in. After mixing for 5 minutes, a stream of carbon dioxide, obtained by the sublimation of solid carbon dioxide, is passed in. The pasty mixture gradually hardens and stirring becomes difficult. After about 30 minutes, the mixture breaks up to give blocks of varying size. This yields a product (850 g) which is light beige in colour and consists of powder and of small blocks which have a greater or lesser degree of hardness and are easy to handle. This product contains 15% by weight of lysine.

After 8 days at a temperature of about 20° C. in an atmosphere saturated with water, there is a moisture uptake of 6 to 7%, but the product retains its initial appearance and remains easy to handle.

EXAMPLE 2

A product (100 g) which has been obtained under the conditions of Example 1, which has a lime (CaO) content of the order of 35% and which has been ground and sieved through a 500μ mesh, is placed in a fluidised-bed granule-producing and -drying device of the Strea 1 type from Société Aeromatic (of Muttenz, Switzerland).

The air flow is adjusted to give good fluidisation. The diffused air contains carbon dioxide originating from the sublimation of solid carbon dioxide.

A slurry consisting of slaked lime (189 g), sieved beforehand through a 500μ mesh, and of a concentrated lysine fermentation broth (438 g) containing 63% of water, is prepared and this is sprayed at a rate of 2 liters/hour on to the fluidised product. The spraying time is 18 minutes. During the first 9 minutes, the temperature of the fluidising air is 35° C., and then it is raised to 48° C. When the spraying has ended, the air is heated to 80° C. for 10 minutes in order to complete the drying.

This yields a product (494 g) which is in the form of granules having a size of less than 1 mm and having the following composition:

| | |
|---|---|
| lysine | 15% |
| dried broth solids (other than lysine) | 30% |
| lime [Ca(OH)$_2$] | 35% |
| calcium carbonate | 15% |
| water | 5% |

After it has been kept for 115 hours at a temperature of about 20° C. in an atmosphere of 100% relative humidity, the product takes up 15% of water without changing its appearance. In particular, the product is not sticky.

EXAMPLE 3

A spraying device of the Lea type [described in Information Chimie No. 189 (May 1979)] is used, which is equipped with a twin-cone chamber without a jacket, with an annular nozzle of internal diameter 6 mm and external diameter 8 mm, with a propane gas burner and with a pump for introducing the slurry to be dried.

A slurry, consisting of slaked lime (2.24 kg), a lysine-broth (8.32 kg) containing water (3.30 kg), and water of dilution (0.6 kg), is prepared. This slurry is introduced into the spraying device with the aid of the pump.

The main operating conditions are as follows:

| | |
|---|---|
| air flow | 88 Nm$^3$/hour |
| temperature in the equatorial plane of the twin-cone chamber | from 170 to 142° C. |
| inlet temperature of the cyclone | from 148 to 128° C. |
| feed rate of the slurry | 35 kg/hour |

The dried product is recovered at the bottom of the cyclone.

The resulting product is in the form of a coffee-coloured powder which is dense, non-powdery and fairly free-flowing. It contains:

| | |
|---|---|
| lysine | 20.2% |
| lime [Ca(OH)$_2$] | 29.6% |
| calcium carbonate | 2.7% |
| water | 2.5% |

EXAMPLE 4

Operating under the conditions of Example 1, concentrated lysine-broth (containing 80% by weight of solids and having a lysine content of 22% by weight; 374 g) is added to light magnesium carbonate (160 g) from Prolabo (of Paris, France). After 2 minutes, the stirring can be stopped and this yields a powder (530 g) which is light beige in colour and free flowing.

EXAMPLE 5

By replacing 50% of the weight of magnesium carbonate by quicklime and by following the procedure of Example 4, a product in the form of a free-flowing powder is obtained.

We claim:

1. A process for the preparation of a stable lysine-containing solid particulate composition, the particles of which do not agglomerate in the presence of atmospheric moisture, which comprises treating a concentrated lysine fermentation broth containing 10 to 40% by weight of lysine and 15 to 70% by weight of water with an inorganic substance selected from the group consisting of (i) lime, in the presence of an amount of carbon dioxide sufficient to produce 2 to 30% of calcium carbonate in the final composition, (ii) precipitated magnesium carbonate, and mixtures thereof, and optionally at least one inorganic filler selected from the group consisting of silicas, silicates and aluminosilicates, and forming solid particles of the resulting mixture to obtain a particulate solid composition containing 10 to 35% by weight of lysine and 10 to 50% by weight of the inorganic substance.

2. A solid particulate composition containing 10 to 35% by weight of lysine when obtained by the process claimed in claim 1.

3. A solid lysine-containing particulate composition according to claim 2 which contains from 10 to 50% by weight of inorganic filler.

4. A solid particulate composition according to claim 2 which contains 10 to 35% of lysine, 5 to 35% of calcium, essentially in the form of slaked lime and calcium carbonate, 2 to 15% of carbon dioxide in the form of about 4 to 30% of calcium carbonate and 1 to 25% of water, the said percentages being by weight, the remainder consisting of solids contained in the broths from lysine-producing fermentations and, optionally, at least one filler.

5. A solid particulate composition according to claim 2 which contains 10 to 35% of lysine, 10 to 50% of precipitated magnesium carbonate and 1 to 15% of water, the said percentages being by weight, the remainder consisting of solids contained in the broths from lysine-producing fermentations and, optionally, at least one filler.

6. A solid particulate composition according to claim 2 which contains 10 to 35% of lysine, 10 to 50% of precipitated magnesium carbonate and of calcium in the form of slaked lime and calcium carbonate, and 1 to 15% of water, the said percentages being by weight, the remainder consisting of solids contained in the broths from lysine-producing fermentations and, optionally, at least one filler.

7. Animal feed which comprises a lysine-containing composition as claimed in claim 2.

8. A process according to claim 1 in which the concentrated lysine broth containing from 15 to 40% by weight of water is treated with lime and optionally with at least one inorganic filler and the mixture is subjected to the action of carbon dioxide in a malaxator.

9. A process according to claim 1 in which a slurry of the concentrated lysine-broth containing from 30 to 70% by weight of water and the inorganic substance and optionally an inorganic filler is sprayed into a fluidized bed and the resulting particulate product is dried.

10. A process according to claim 1 in in which a slurry of the concentrated lysine-broth containing from 30 to 70% by weight of water and the inorganic substance, and optionally an inorganic filler is sprayed from a spraying device and the resulting particulate product is dried.

* * * * *